United States Patent

Gershen et al.

[11] Patent Number: 5,854,519
[45] Date of Patent: Dec. 29, 1998

[54] ASYMMETRICAL AC TRIGGER SIMULATION

[75] Inventors: Bernard J. Gershen, Centerport; Alfred J. Lombardi, La Grangeville; Edward J. Krajci, Franklin Square; Yevgeny Shafir, Jamaica Estates, all of N.Y.

[73] Assignee: Leviton Manufacturing Co., Inc., Little Neck, N.Y.

[21] Appl. No.: 821,748

[22] Filed: Mar. 20, 1997

Related U.S. Application Data

[63] Continuation of Ser. No. 183,459, Jan. 18, 1994, Pat. No. 5,619,081.

[51] Int. Cl.⁶ .................................................. H01H 47/00
[52] U.S. Cl. .......................................... 307/125; 327/457
[58] Field of Search ..................................... 307/112, 113, 307/116, 125, 129, 139, 140, 157; 315/194, 199, 299, 361, 362, DIG. 2; 323/265, 273, 282, 284, 300, 905; 327/419, 438, 447, 452, 455, 457

[56] References Cited

U.S. PATENT DOCUMENTS

| | | | |
|---|---|---|---|
| 4,006,368 | 2/1977 | Ichikawa | 327/457 |
| 4,914,327 | 4/1990 | Dekker | 327/457 |
| 5,619,081 | 4/1997 | Gershen et al. | 307/125 |
| 5,668,496 | 9/1997 | Rebordosa | 327/452 |

*Primary Examiner*—Richard T. Elms
*Attorney, Agent, or Firm*—Paul J. Sutton

[57] ABSTRACT

The present invention teaches a dimmer which incorporates an alternating current (AC) trigger which exhibits asymmetrical electrical characteristics. This eliminates the undesirable snap on hysteresis effect associated with conventional dimmers utilizing symmetrical AC triggers such as diacs and silicon bilateral switches (SBS). One embodiment of the present invention utilizes a zener diode to create the asymmetry. During one polarity of the AC source, the breakover voltage of the trigger is increased, forcing the trigger to breakover at a time later in the AC cycle than it would otherwise have with a symmetric trigger. This compensates for charge dumping of the phase control capacitor into the gate of the triac which would otherwise cause the snap on hysteresis effect.

6 Claims, 4 Drawing Sheets

ASYMMETRICAL AC TRIGGER SIMULATION

This Application is a continuation of U.S. patent application Ser. No. 08/183,459 filed Jan. 18, 1994 and now U.S. Pat. No. 5,619,081 issued Apr. 8, 1997.

BACKGROUND OF THE INVENTION

The present invention relates generally to the field of electric light dimmers and controls, and more particularly to a system for controlling and eliminating undesirable characteristics associated with conventional electric light dimmers, such as what is known as snap on hysteresis effects.

Conventional low cost light dimmers of the type a consumer might purchase from his or her local hardware or mass merchandising store presently exhibit an undesirable characteristic which will herein be referred to as the snap on hysteresis effect. This effect manifests itself in the operation of a dimmer by causing the lamp to which the dimmer is connected (such as an incandescent electric light bulb) to turn on at an initial brightness level somewhat and often significantly higher than the minimum brightness level achievable. This effect is both unexpected and undesirable.

Typically, dimmer designs today incorporate semiconductor devices that perform the dimming function, and comprise an AC switch and a trigger control circuit to control the AC switch. Conventional trigger circuits employ diacs connected to the gate of a triac which acts as the AC switch to turn the triac on and turn off. A phase shift circuit used with the diac determines where in the half cycle of the AC voltage supply wave the triac fires, thereby determining the duration of time current flows through the lamp which, in turn, determines its brightness. A typical phase control circuit of the type presently being sold by Leviton Manufacturing Co., Inc. of Little Neck, N.Y., for example, utilizes a trigger that exhibits symmetrical electrical characteristics during both positive and negative half cycles of the AC voltage. Due to characteristics of the triac, however, the phase control circuit exhibits asymmetrical electrical characteristics when controlling the gate of a triac. The end result is that the triac triggers earlier in the half cycle than it would otherwise have and at a higher than minimum brightness level. A user, when confronted with the higher than desired brightness level, will back off the control (turn the control knob, for example, in the dimming direction) to achieve brightness levels closer to the minimum achievable level.

In addition to the undesirable higher initial brightness level of the lamp, another drawback of the snap on effect is that if power is interrupted and the brightness was backed off after initial turn on, and thereafter the power was restored, the light might not come on at all. Furthermore, if the phase control circuit utilizes a series of stepped resistances instead of a potentiometer, it is not possible with such conventional devices to reach relatively lower brightness level.

Prior art attempts to solve this snap on hysteresis problem have included utilizing two circuits to control the firing of the triac, rather than a single circuit. The first such circuit controls the timing (i.e. brightness) of firing, while the second circuit controls the charge dumping of the capacitor into the gate of the triac. Drawbacks with this prior art approach include an increase in cost and added complexity of the overall circuitry.

Another attempted solution to the snap on hysteresis problem is to use an asymmetrical trigger in the phase control circuit. This can be done using a number of discrete components or using AC triggers having asymmetrical electrical characteristics. The resulting devices, however, are not believed to be commercially available and having to add a number of components to a phase control circuit design to achieve the effect of an AC trigger increases its cost and complexity.

The result has been a long felt need for a solution to this problem that is simple and effective, and yet costs very little in terms of component cost and circuit complexity.

SUMMARY OF THE INVENTION

A primary object of the present invention is to provide an AC trigger having asymmetrical electrical characteristics so as to eliminate the snap on hysteresis effect.

Another object of the present invention is to provide such an AC trigger which is relatively inexpensive.

Yet another object of the present invention is to provide an AC trigger which is simple and relatively easy to incorporate into circuits.

Other objects and features of the invention will be pointed out in the following description and claims and illustrated in the accompanying drawings, which disclose, by way of example, the principles of the invention, and the best modes presently contemplated for carrying them out.

BRIEF DESCRIPTION OF THE DRAWINGS

In the drawings in which similar elements are given similar reference characters.

DETAILED DESCRIPTION OF THE INVENTION

In order to provide,the reader with a more complete understanding of the present invention and an appreciation of its advantages, a description of a preferred embodiment of the present invention in a typical operating environment is presented below.

Figure 1:
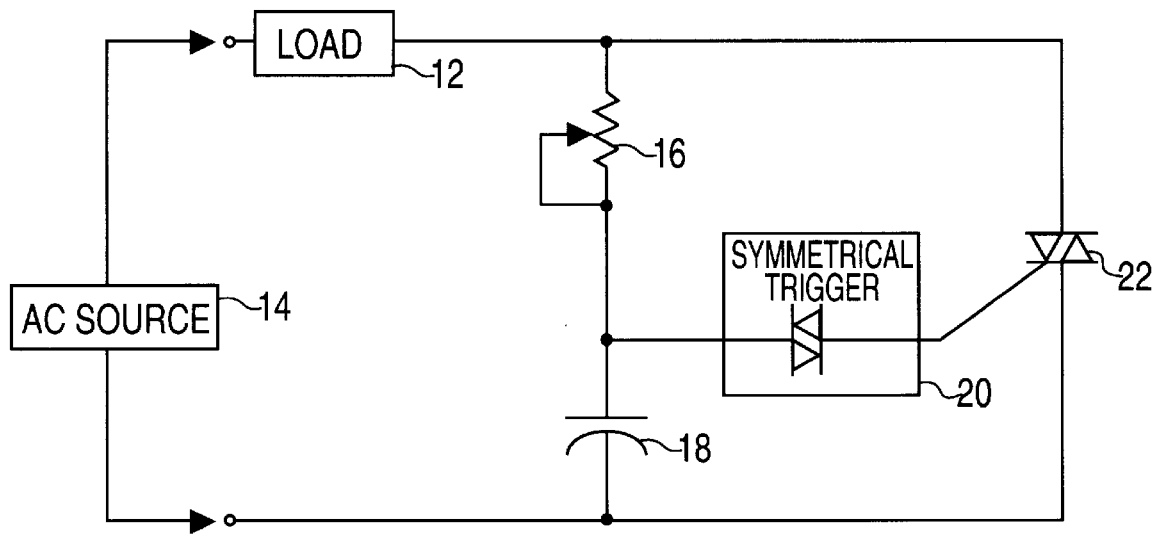
FIG. 1 is a circuit diagram of a conventional dimmer of the type found in the prior art.
Figure 1A:
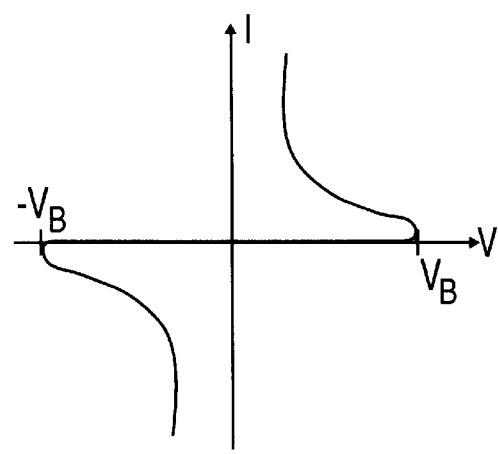
FIG. 1A is a graph illustrating typical electrical characteristics of a symmetrical trigger as found in the prior art.

Shown in FIG. 1 is a schematic showing a conventional triac phase control circuit as found in the prior art and used extensively in dimming and other applications such as motor speed controls. The characteristics of its symmetrical trigger are shown in FIG. 1A. Conventional low cost dimmers typically employ this type of circuit. It suffers, however, from a feature called snap on hysteresis. At the start of a positive half cycle, assuming the dimmer shown in FIG. 1 is energized, and the potentiometer 16 is set to maximum resistance, the load 12, typically a lamp, will be off. This is because the peak voltage across the capacitor 18 does not exceed the symmetrical trigger or diac 20 breakover voltage $V_B$. As the resistance of potentiometer 16 is reduced, a point will be reached where the capacitor 18 voltage exceeds the diac 20 breakover voltage $V_B$. When the diac 20 breaks over, charge from the capacitor 18 flows into the gate of the triac 22 to turn it on. At the same time, the capacitor 18 voltage drops to a value less positive than before the reduction in charge. As shown in FIG. 1A, the symmetrical trigger or diac 20 exhibits negative resistance as it starts conducting more current. Thus, as the triac starts conducting, the voltage across the diac 20 drops. This allows more charge to flow from the capacitor 18 into the gate of the triac 22. At this point, during the following negative half cycle of the AC source 14, the diac 20 breakover voltage–$V_B$ is reached sooner because the capacitor 18 has a reduction in maximum positive voltage due to its loss of charge in the positive half cycle. The result is that subsequent diac 20 trigger or breakover points, both positive and negative, occur earlier than the diac 20 breakover point of the very first half cycle. Triggering the diac 20 sooner in the AC cycle causes the light to turn on at a higher voltage. This results in the light 12 being brighter than that which the first half cycle would have provided. In order for a user to dim the light, the potentiometer 16 resistance must be increased. It is undesirable to require a user to reduce brightness after turning on the light.

Figure 2:
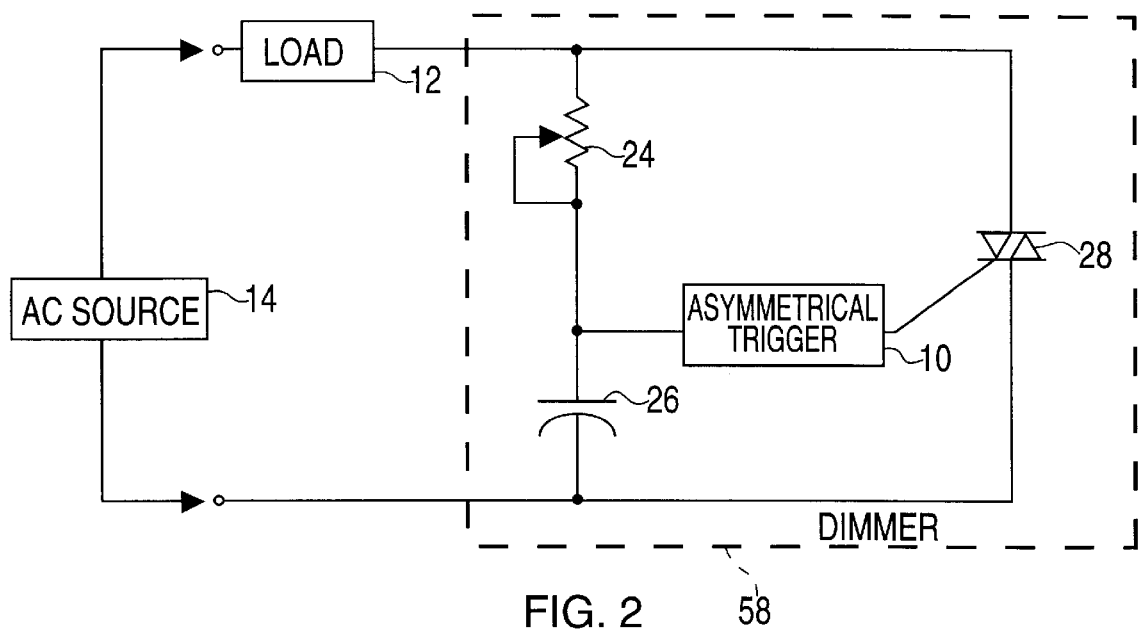
FIG. 2 is a circuit diagram of a dimmer constructed according to the concepts of the present invention.
Figure 2A:
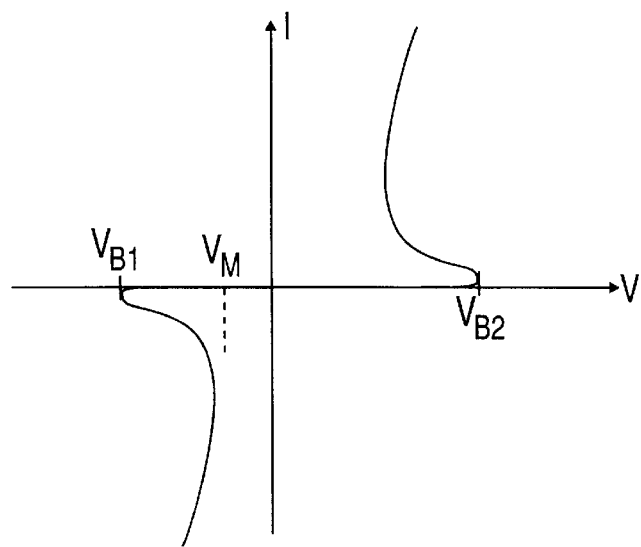
FIG. 2A is a graph illustrating the electrical characteristics of the dimmer of FIG. 2.
Figure 3:
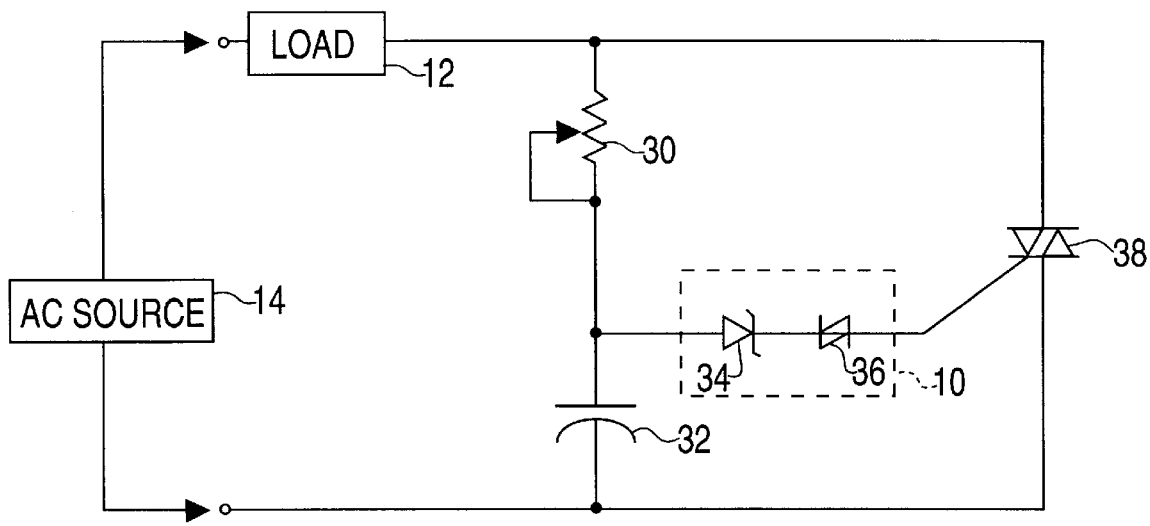
FIG. 3 is a circuit diagram of a further embodiment of a dimmer constructed according to the concepts of the present invention.
Figure 4:
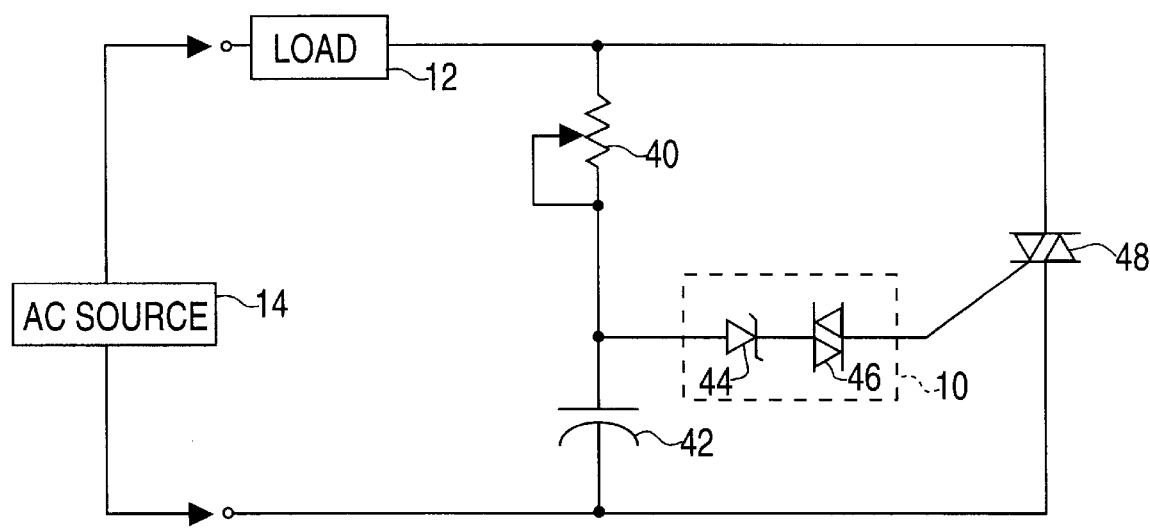
FIG. 4 is a circuit diagram of yet another embodiment of a dimmer constructed according to the concepts of the present invention.
Figure 5:
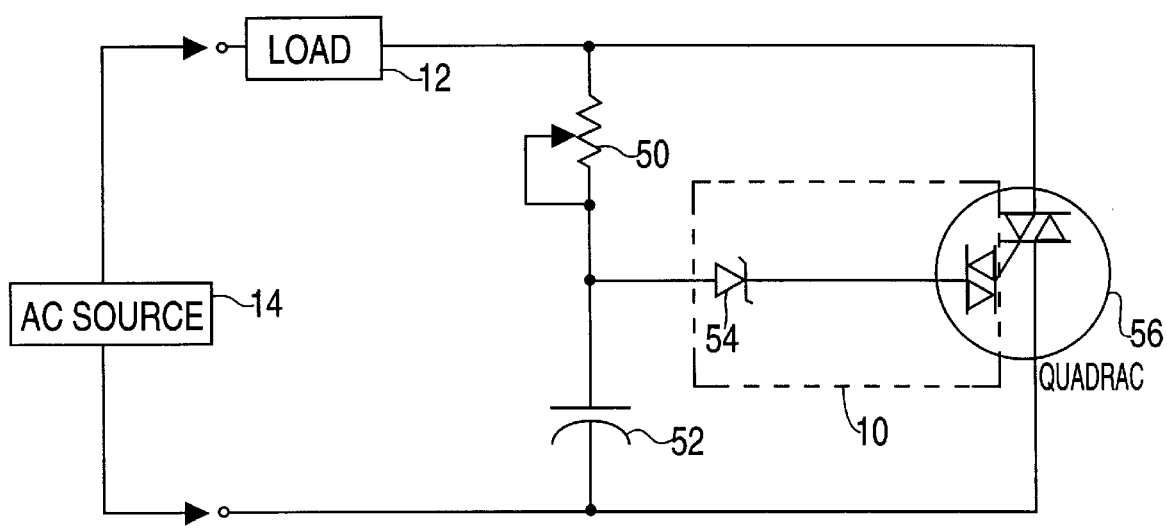
FIG. 5 is a circuit diagram of still another embodiment of a dimmer constructed according to the concepts of the present invention.

The solution of this problem afforded by the present invention is to provide an asymmetrical trigger or diac. FIG. 2 shows a block diagram of a dimmer 58 incorporating an asymmetrical trigger 10 connected between the phase control circuit consisting of potentiometer 24 and capacitor 26 and a triac 28. The trigger characteristics of the asymmetrical trigger 10 are shown in FIG. 2A. FIGS. 3 to 5 show alternative applications of the asymmetrical trigger 10 in dimming circuits.

Referring to FIG. 2A, in one polarity, the breakover voltage $V_{B1}$ is the same as in a symmetrical diac. In the other polarity, however, the breakover voltage $V_{B2}$ is increased by the same amount as the voltage difference between breakover and maintenance in the first polarity, $V_{B1-VM}$. The result is that even though the capacitor 26 voltage is reduced during the first half cycle, it must charge to the higher breakover voltage, thus maintaining the brightness level of the first half cycle.

Since an asymmetrical trigger device as a single component is not available, its characteristics have been simulated with the present invention. This has been done using a zener diode 34 in series with a silicon bilateral switch (SBS) 36, as shown in FIG. 3. The zener breakdown voltage is chosen to be the difference between the breakover and maintaining voltage of the SBS. Assume initially the capacitor 32 is fully discharged, with the potentiometer 30 near its maximum setting, the capacitor 32 begins charging. When the capacitor 32 voltage reaches the breakover voltage of the SBS 36, it starts conducting and current flows through the zener 34, which is forward biased, into the gate of the triac, turning it on. Ass current flows into the gate of the triac 38, the voltage across the SBS 36 drops to its maintaining voltage due to its negative impedance characteristics. As in the case of a diac trigger, this causes additional charge to be removed from capacitor 32. In the following half cycle the zener 34 is now reverse biased and will not conduct until its breakdown voltage is reached. The zener 34 breakdown voltage, however, is chosen to be the difference between the breakover and maintaining voltage of the SBS 36. Therefore, the capacitor 32 must charge an additional amount; the value of the zener 34 breakdown voltage. Thus, utilizing an asymmetrical trigger causes the SBS 36 and the triac 38 to trigger later in the AC cycle than it would have with a symmetrical trigger, thereby causing the elimination of the undesirable snap on hysteresis effect.

In an alternative embodiment of the present invention, an approach is used in conjunction with a conventional symmetric diac 46, as shown in FIG. 4. As with the design utilizing the SBS 36, the requirement here is that the zener 44 breakdown voltage equal the difference the breakover and maintaining voltage of the diac 46. The operation of the device of FIG. 4 is substantially similar to that described with respect to the SBS 36.

In yet another embodiment of the present invention, the desired result is achieved utilizing a quadrac semiconductor device 56, as shown in FIG. 5. The quadrac consists of a triac with a diac connected in series with the gate of the triac. The operation of the device of FIG. 5 is substantially the same as described above with respect to the SBS 36 of FIG. 3.

The same benefits which have been described above utilizing dimming circuits as examples of the environment for the present invention may also be achieved using a triac based motor speed control which uses a circuit similar to that of a dimmer.

While there have been shown and described and pointed out the fundamental novel features of the invention as applied to the preferred embodiment, it will be understood that various omissions and substitutions and changes of the form and details of the device illustrated and its operation may be made by those skilled in the art, without departing from the sprit of the invention.

The embodiments of the invention in which an exclusive property or privilege is claimed are defined as follows:

What is claimed is:

1. A dimmer comprising:
   a) switching means having first and second terminals and a gate terminal; said first terminal connected to one side of a load; said second terminal connected to a source of AC voltage; said switching means operable to change from a state of high impedance to a state of low impedance upon the application of sufficient current to said gate terminal causing current to flow through said load;
   b) a conductor coupled between the other side of said load and said source of AC voltage;
   c) symmetrical trigger means having third and fourth terminals, said symmetrical trigger means fourth terminal coupled to said gate terminal of said switching means for preventing said switching means from changing state until sufficient voltage appears across said third and fourth terminals of said symmetrical trigger means; said symmetrical trigger means exhibiting negative impedance characteristic upon breakover and having similar breakover points during both positive and negative half cycles of a source of AC voltage;
   d) phase control means coupled between said one side of said load, said source of AC voltage and to an output terminal; and
   e) asymmetrical trigger means connected between said output terminal of said phase control means and said third terminal of said symmetrical trigger means, said symmetrical trigger means operable to compensate for charge depletion in said phase control means caused by said symmetrical trigger means; said asymmetrical trigger means effective to change state asymmetrically during each half cycle of said AC voltage.

2. A dimmer, as defined in claim 1, wherein said phase control means further comprises:
   a) potentiometer means having a fifth and sixth terminal, said fifth terminal coupled to said one side of said load to control the current flowing to said load from said source of AC voltage;
   b) a capacitor having seventh and eighth terminals, said eighth terminal connected to said source of AC voltage; and said seventh terminal of said capacitor coupled to said sixth terminal of said potentiometer and to said asymmetrical trigger means.

3. A dimmer, as defined in claim 1, wherein said asymmetrical trigger means includes a silicon bilateral switch.

4. A dimmer, as defined in claim 1, wherein said asymmetrical trigger means includes a diac.

5. A dimmer, as defined in claim 1, wherein said asymmetrical trigger means includes a quadrac wherein a diac of said quadrac comprises said symmetrical trigger means.

6. A dimmer, as defined in claim 1, wherein said asymmetrical trigger means includes a zener breakdown diode.

* * * * *